United States Patent [19]
Mori et al.

[11] Patent Number: 5,644,339
[45] Date of Patent: Jul. 1, 1997

[54] ELECTRONIC INFORMATION APPARATUS

[75] Inventors: Shigeki Mori, Koshigaya; Eisaku Tatsumi, Yokohama; Atsushi Tanaka, Kawasaki; Kazuhiro Matsubayashi, Yokohama, all of Japan

[73] Assignee: Canon Kabushiki Kaisha, Tokyo, Japan

[21] Appl. No.: 370,351

[22] Filed: Jan. 9, 1995

Related U.S. Application Data

[63] Continuation of Ser. No. 909,717, Jul. 7, 1992, abandoned.

[30] Foreign Application Priority Data

Jul. 10, 1991 [JP] Japan ................................. 3-169629

[51] Int. Cl.[6] ........................................................ G09G 5/00
[52] U.S. Cl. ............................................... 345/173; 345/901
[58] Field of Search ...................................... 340/706, 709, 340/712; 178/18, 19, 20; 345/156, 173, 901, 902; 364/705.02, 705.03, 705.06

[56] References Cited

U.S. PATENT DOCUMENTS

| | | | |
|---|---|---|---|
| 4,839,634 | 6/1989 | More et al. | 178/18 |
| 4,860,372 | 8/1989 | Kuzunuki et al. | 178/18 |
| 4,910,696 | 3/1990 | Grossman et al. | 364/705.02 |
| 5,063,600 | 11/1991 | Norwood | 340/712 |
| 5,121,442 | 6/1992 | Togawa et al. | 340/709 |
| 5,148,155 | 9/1992 | Martin et al. | 340/712 |
| 5,157,384 | 10/1992 | Greanias et al. | 340/712 |

*Primary Examiner*—Chanh Nguyen
*Attorney, Agent, or Firm*—Fitzpatrick, Cella, Harper & Scinto

[57] ABSTRACT

An electronic information apparatus for receiving information input in a plurality of formats and receiving a particular category of information capable of being registered in at least two corresponding formats includes a coordinate input apparatus for inputting information containing the particular category of information and a discriminator, for identifying one of the formats, associated with the particular category of information, a detector for detecting the discriminator, an extractor for extracting the particular category of information associated with the discriminator from the input information, and a memory for registering the extracted particular category of information in the format identified by the discriminator detected by the detector and for registering the particular category of information in another corresponding format.

34 Claims, 6 Drawing Sheets

STYLUS PEN

```
21 ┌ MEMO                              P - 5
   │
   │   DA'90. 12. 5
   │       PM 6:15  MEET AT STATION WICKET
   │
   │           RE: PERIODICAL SU MEETING
   │
   │   NA      Ichiro YAMADA Mr.
   │       TEL  03 (3456) 7890
   │
   │                              ┌─────────────┐
   │                              │ TO RELATED  │
   │                              │ INFORMATION │
   │                              └─────────────┘
                                          40
```

19, 20 (menu)

FIG. 8

```
21 ┌ ADDRESS NOTE                    P - 55
   │  NAME :   Ichiro YAMADA
   │  ADDRESS:
   │
   │
   │  TEL :  03 (3456) 7890
   │  FAX :
   │  REMARKS:
   │                          ┌─────────────┐
   │                       40 │ TO RELATED  │
   │                          │ INFORMATION │
   │                          └─────────────┘
```

19, 20 (menu)

ELECTRONIC INFORMATION APPARATUS

This application is a continuation of application Ser. No. 07/909,717 filed Jul. 7, 1992, now abandoned.

BACKGROUND OF THE INVENTION

1. Field of the Invention

This invention relates to an electronic information apparatus operating in a plurality of modes for inputting and displaying data in the form of a memorandum, an address note, a scheduler and the like and has a format for displaying or inputting data in each of these modes.

2. Description of the Prior Art

Conventional electronic information apparatuses represented by electronic notebooks or pocketbooks have an input window change means for selecting and displaying on a display different format windows for a memorandum, an address note, a scheduler and the like to which data is to be input, an item designation means for designating an item in each format window to which data is to be input, and a data input means for inputting data to the item.

In conventional apparatuses, however, to arrange input items such as a telephone number, a name, an address, a date, a business message and the like and to utilize it as information, it is necessary to correctly input, for example, a name, an address and a telephone number to a format window of an address note, or a date and an important business message to a scheduler window according to purposes. In the case of inputting memo information or the like consisting of various items used in different formats, the following problems are encountered.

(1) It is necessary to take a new look at memo information after the completion of inputting the information, or to input it again to a suitable item by a cut-and-paste operation.

(2) In a case where data is input while successively changing suitable format windows, the operation of changing the present mode to another mode relating to the format windows is required.

SUMMARY OF THE INVENTION

It is an object of the present invention to overcome the problems of the prior art.

It is another object of the present invention to provide an electronic information apparatus capable of inputting information in different formats using a simple operation.

It is still another object of the present invention to provide an electronic information apparatus in which it is not necessary to take an additional look at memo information after such memo information has been inputted into the apparatus in order to determine whether such information should be registered in another format.

It is still another object of the present invention to provide an electronic information apparatus in which the user can easily change format windows and can easily change modes of the apparatus for inputting, displaying, or outputting information.

According to one aspect, the invention which achieves these objectives relates to an electronic information apparatus for receiving input information in a plurality of formats and receiving a particular category of information capable of being registered in at least two corresponding formats. The apparatus comprises input means for inputting information containing the particular category of information and a discriminator, for identifying one of the formats, associated with the particular category of information, detection means for detecting the discriminator input with the information input by the input means, extraction means for extracting the particular category of information associated with the discriminator detected by the detection means from the input information, and registration means for registering the extracted particular category of information in the format identified by the discriminator detected by the detection means and for registering the particular category of information in another corresponding format.

The input means can comprise coordinate input means for inputting the coordinates of the input information. The apparatus can also further comprise recognition means for recognizing the information input by the input means, memory means for storing the information recognized by the recognition means, display means for displaying the recognized information stored in the memory means, and memory means for storing the particular category of information registered by the registration means.

According to another aspect, the present invention which achieves these objectives relates to a method of collecting information in an electronic information apparatus for receiving input information in a plurality of formats and receiving a particular category of information capable of being registered in at least two corresponding formats. The method comprises an input step of inputting information containing the particular category of information and a discriminator, for identifying one of the formats, associated with the particular category of information, a detection step of detecting the discriminator input with the information input in the input step, an extraction step of extracting the particular category of information associated with the discriminator detected in the detection step from the input information, and a registration step of registering the extracted particular category of information in the format identified by the discriminator detected in the detection step and registering the particular category of information in another corresponding format.

The method can further comprises a recognition step of recognizing the information input in the input step, a storage step for storing in memory means the information recognized in the recognition step, a display step for displaying the recognized information stored in the memory means, and a storage step for storing in another memory means the particular category of information registered in the registration step.

According to still another aspect, the present invention which achieves these objectives relates to an electronic information apparatus having a plurality of formats in which information is output and capable of receiving a particular category of information to be output in at least two corresponding formats. The apparatus comprises input means for inputting information in the form of a pattern containing a discriminator associated with a particular category of information in the pattern, detection means for detecting the discriminator input with the pattern input by the input means, extraction means for extracting the particular category of information associated with the discriminator detected by the detection means from the input pattern, and registration means for registering the extracted particular category of information associated with the discriminator detected by the detection means as data to be output in at least two corresponding formats.

The input means can comprise coordinate input means for inputting coordinates of the pattern, and the apparatus can further comprise recognition means for recognizing information input by the input means, memory means for storing the information recognized by the recognition means, display means for displaying the recognized information stored in the memory means, and memory means for storing the particular category of information registered by the registration means.

According to still another aspect, the present invention which achieves these objectives relates to a method of collecting information in an electronic information apparatus having a plurality of formats in which information is input and capable of receiving a particular category of information to be registered in at least two corresponding formats. The method comprises an input step of inputting information in the form of a pattern containing a discriminator associated with a particular category of information in the pattern, a detection step of detecting the discriminator input with the pattern input in the input step, an extraction step of extracting the particular category of information associated with the discriminator detected in the detection step from the input pattern, and a registration step of registering the extracted particular category of information associated with the discriminator detected in the detection step in at least two corresponding formats.

The method further comprises a recognition step of recognizing the information input in the input step, a storage step for storing in memory means, the information recognized in the recognition step, a display step for displaying the recognized information stored in the memory means and a storage step for storing in another memory means the particular category of information registered in the registration step.

These and other objects, advantages, and features of the present invention will become more apparent from the following detailed description of the preferred embodiments taken in conjunction with the accompanying drawings.

DESCRIPTION OF THE PREFERRED EMBODIMENTS

Figure 1:
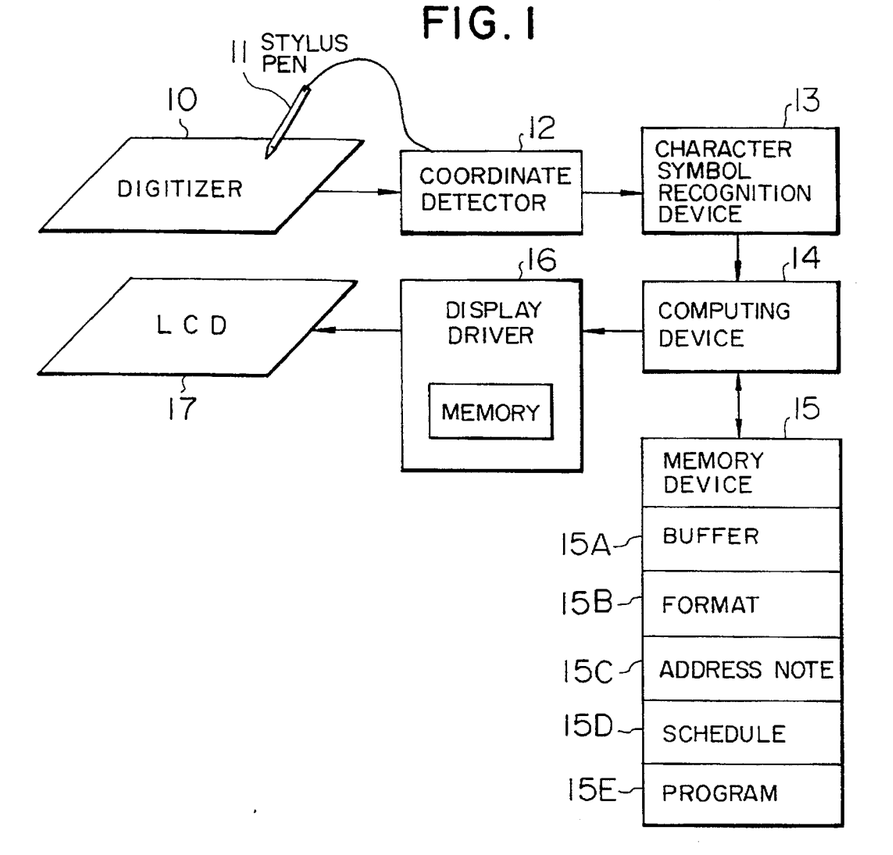
FIG. 1 is a block diagram of an embodiment of the present invention.
Figure 2:
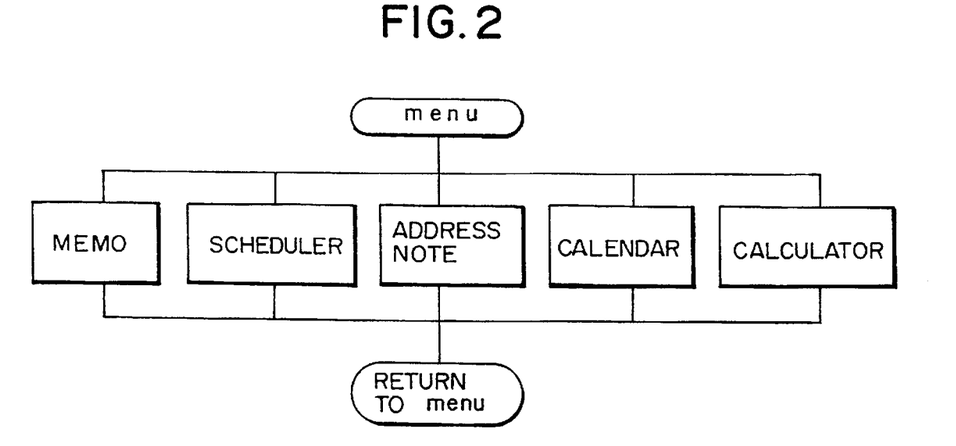
FIG. 2 is a flow chart of the selection of functions in accordance with the embodiment.

An electronic information apparatus shown in FIG. 1 has a digitizer 10 and a stylus pen 11 for designating an arbitrary position on the digitizer 10. The position designated with the stylus pen 11 is discriminated and input as coordinate data. The apparatus also has a coordinate detector 12 for detecting the position at which the stylus pen 11 is placed on the digitizer 10, a character/symbol recognition device 13 for recognizing character/symbol data based on coordinate data supplied from the coordinate detector 12, a computing device 14 for processing recognized data, and a memory device 15 for storing various categories of data and a program of the process shown in FIGS. 2 and 3, which process is executed by the computing device 14. The apparatus further has a display driver 16 and a liquid crystal display (LCD) 17. The display driver 16 has a bit map memory for storing information displayed on the LCD 17. Information to be displayed is sent to the display driver 16 by the computing device 14.

In the thus-constructed apparatus, the digitizer 10 and the LCD 17 are constructed by being integrally superposed, and handwriting input to the digitizer 10 with the stylus pen 11 is detected as coordinate data by the coordinate detector 12. The detected coordinate data is recognized as characters or symbols by the character/symbol recognition device 13, and then the character/symbol recognition device 13 generates character codes or symbol codes representative of characters or symbols. Characters or symbols thereby recognized are converted into corresponding character or symbol fonts by the computing device 14 and are stored in the memory of display driver 16 and are displayed on the LCD 17 in the same positions as the corresponding handwritten characters input with the stylus pen 11.

Figure 4:
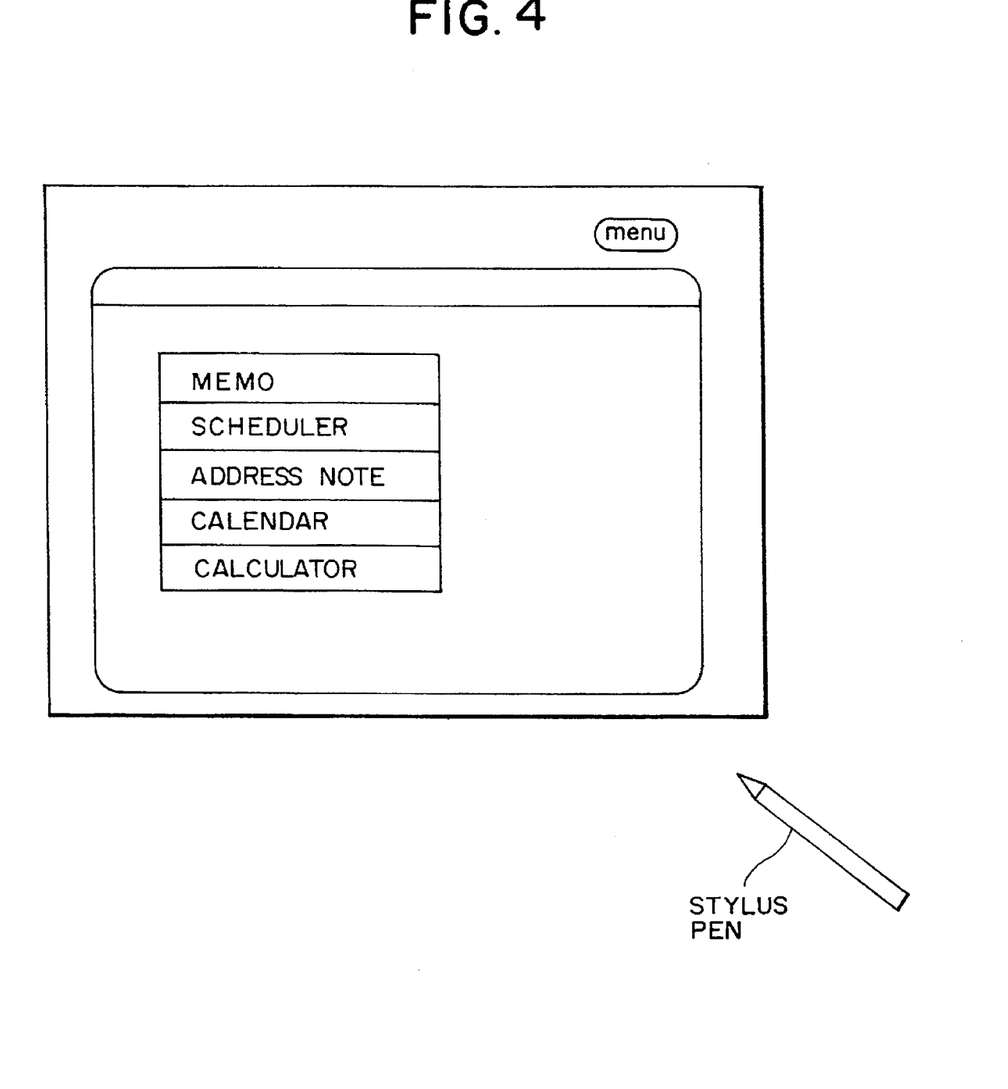
FIG. 4 is an illustration of a menu window.
Figure 5:
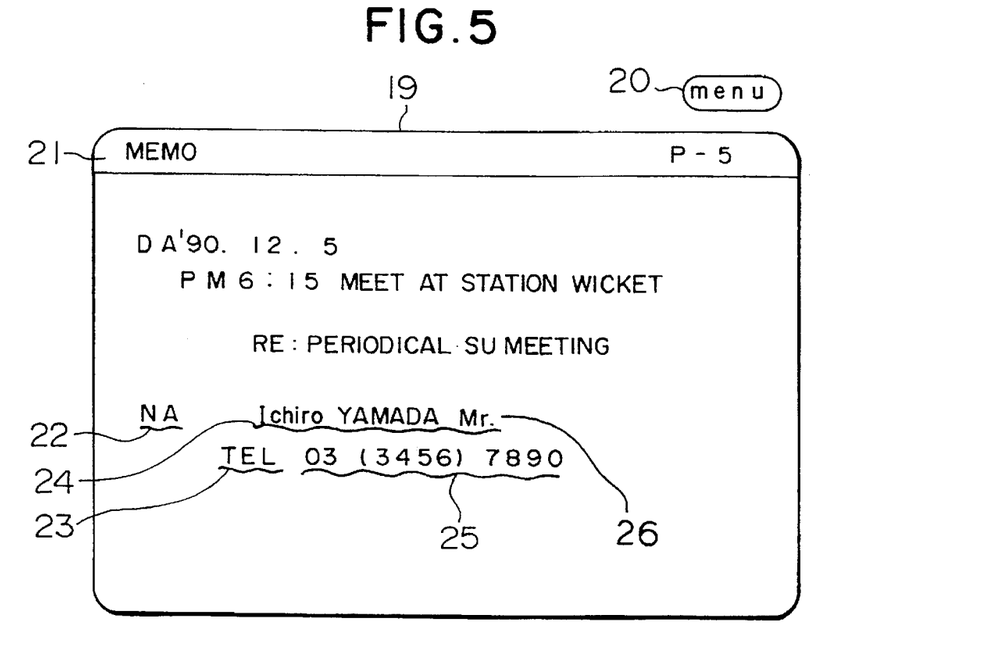
FIG. 5 is an illustration of a memo window.

In this apparatus, information is input in the manner of writing characters of a sheet of paper in accordance with each of various application programs stored in the memory device 15, and the input information is arranged and edited into groups of data in various formats for a memo, an address note, a schedule note and the like, which are displayed in respective display modes (memo mode, address note mode, and so on). A memo mode is a mode in which characters and symbols freely selected by the user can be written in positions also freely selected by the user in a memo area. At an initial stage, a menu for selecting one of the modes comprising a memo, a scheduler, an address note, a calendar, a calculator and the like is displayed on the screen of the display, as shown in FIG. 4. If in this state, "memo" in the menu is selected with the stylus pen 11, a memo window such as that shown in FIG. 5 is displayed on the screen. If in this state a locus is drawn on the digitizer 10 with the stylus pen 11, it is recognized in the following manner. If the locus is recognized as a character or a symbol by device 13, corresponding character fonts are displayed by the LCD 17. If the locus is not recognized as any character or symbol by device 13, the device 14 recognizes the pattern of the locus from data on the locus from devices 12 and 13 and generates data used by the driver 16 to display the pattern on LCD 17.

Figure 9:
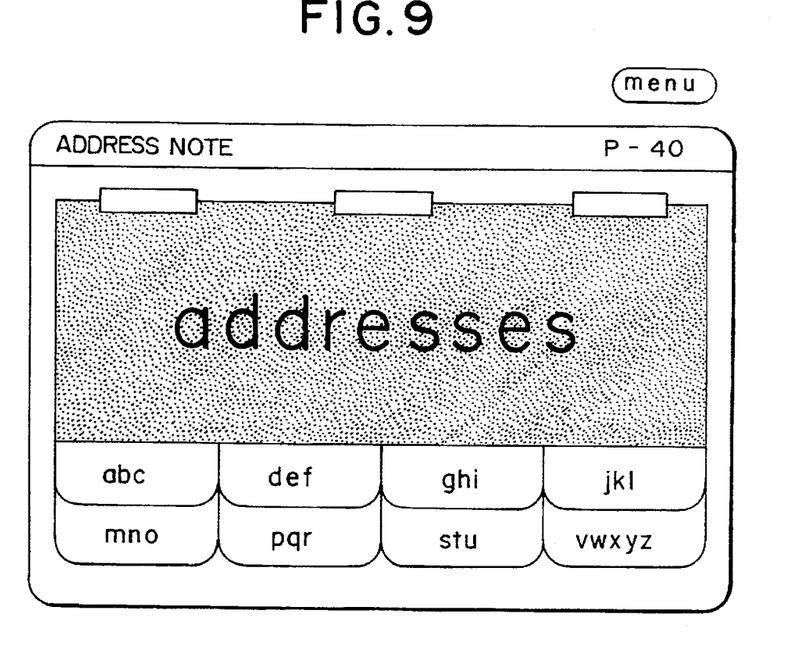
FIG. 9 is an illustration of an address note menu.
Figure 10:
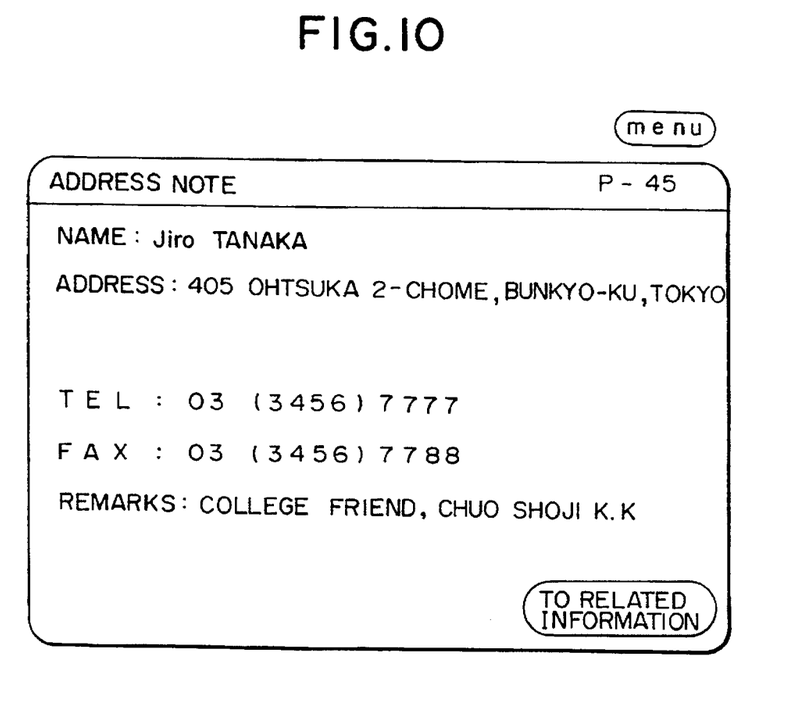
FIG. 10 is a particular window of the address note.

An address note mode can also be selected in the menu window with the stylus pen. The address note mode is a mode in which names, addresses, telephone numbers of persons, remarks and the like can be input, and in which the utilization of information in the address mode format, e.g., displaying a telephone number list or searching for a telephone number from a name, can be performed. When the address note mode is selected, a window such as that shown in FIG. 9 is first displayed. If one of the index items thereof is selected, personal information such as that shown in FIG. 10 is displayed.

This is accomplished by placing the pen 11 on the index item the user selects, e.g., "abc", "def" . . . The apparatus then displays the names in the category chosen by the user. The user then uses the pen 11 to select a displayed name by placing the pen on the selected name. As a result, information associated with the chosen name is then displayed as shown in FIG. 10.

Figure 3:
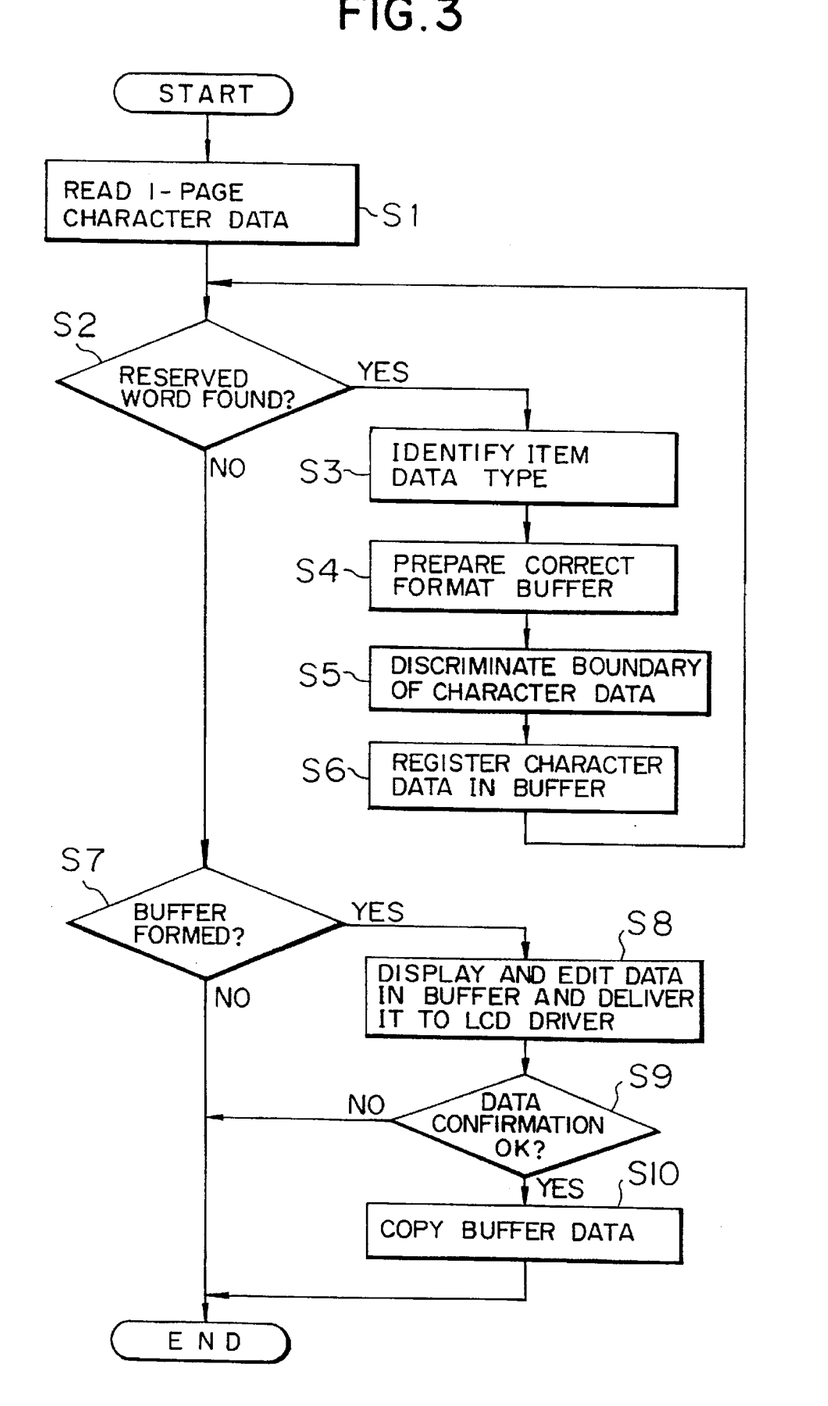
FIG. 3 is a flow chart of the selection and filing of information input as memo information.

An automatic item input process in accordance with the present invention will be described below with reference to the flowchart of FIG. 3. The automatic item input process is conducted based on a program started when processing with respect to one window in the memo mode is terminated, that is, it is conducted as final processing of a memo processing procedure, or it is conducted according to need.

In step S1, character/symbol data displayed in one window is read with an input buffer 15A of the memory device 15. In step S2, the read data is successively scanned by the computing device 4 to determine whether there is a reserved word previously registered in the program area 15E. If a reserved word is thereby found, the process proceeds to step S3 to identify a format and an item proper to the data and associated with the data. In step S4, a buffer 15B having a correct format for the reserved word is prepared in a predetermined area in the memory device 15 based on the result of the identification. In step S5, a boundary of a series of character data starting from the reserved word in the input buffer 15A is discriminated. In step S6, the character data series starting from the reserved word and divided from the other character data is registered in the format buffer buffer 15B prepared in step S4. When this registration processing is completed, the process returns to step S2.

If in step S2 no reserved word is found by the computing device 14, the process proceeds to step S7 to determine whether format buffer 15B has been prepared. If it has been prepared, the process proceeds to steps 8 and 9 for confirmation of the data registered in the format buffer 15B. If it is thereby determined that the data is appropriate, the process proceeds to step S10 to add the data in the format buffer 15B into another memory by copying the data into another memory associated with the mode in which the corresponding format is used, i.e., an area 15C associated with the address note mode in this case, thereby completing the automatic item input routine. Alternatively, or in addition thereto, the data can be copied into the area 15D associated with the schedule mode. If it is determined in step S7 that format buffer 15B has not been prepared, the automatic item input routine is automatically terminated.

Details of the operation of the above-described automatic item input process will be described below with reference to FIGS. 5 and 6.

FIG. 5 is a diagram of the display on the LCD 17 during inputting of data in the memo mode. A window 19 displayed on the electronic information display apparatus of this embodiment, i.e., the LCD 17, includes a menu button 20 provided in a marginal area, a mode bar 21 for indicating the present mode, a reserved word "NA" 22 positioned adjacent an item of data comprising a name or names (i.e., a name item) input into the apparatus in the address note format, a reserved word "TEL" 23 positioned adjacent an item of data comprising a telephone number (i.e., a telephone number item) input into the apparatus in the address note mode, a name data 24 which follows the reserved word "NA" 22, a telephone number data 25 which follows the reserved word "TEL" 23, and a reserved word "Mr." 26 for indicating a boundary of name data adjacent to the reserved word "NA" 22.

Figure 6:
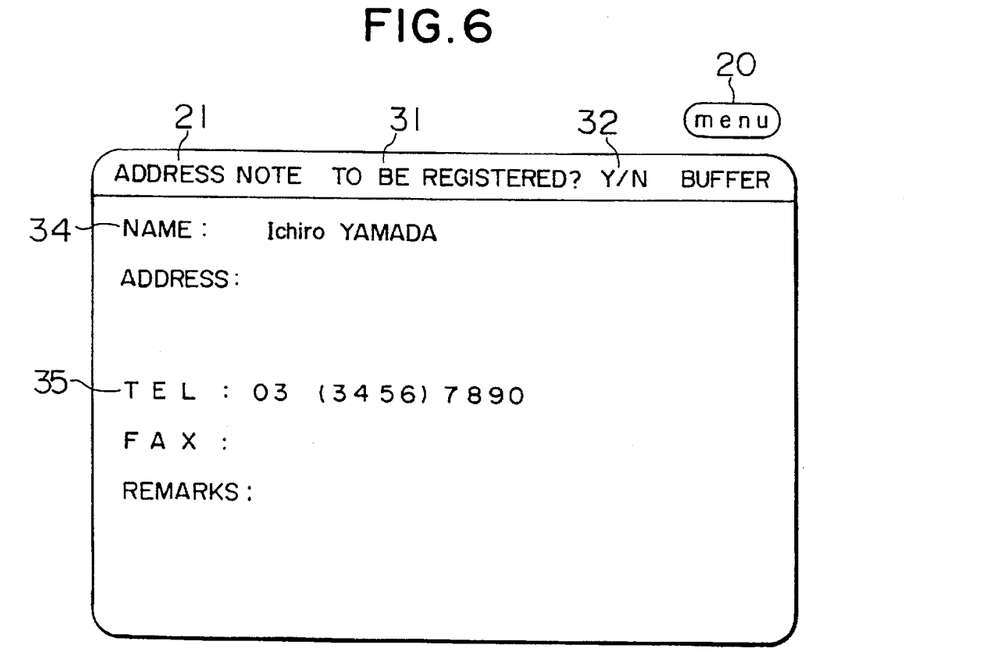
FIG. 6 is an illustration of a window for confirming registration in an address note.

FIG. 6 shows a window for confirming data which is performed in step S8 of the above-described automatic item input routine. The window formed and displayed in step S8 includes a message bar 31 for showing a message, an icon switch button 32 for inputting an operator's intention with respect to the message shown in message bar 31. In the example shown in FIG. 6 this button permits the operator to register or not to register the address note shown in FIG. 6. Thus, for example, if the pen 11 is placed on "y", the data in the address note will be registered in the example shown in FIG. 6. The window formed and displayed in step S8 also includes a name item display position 34 at which the word "NAME" is displayed and adjacent to which a name is displayed which is input in an address note format window, and a telephone number item displayed position 35 at which the word "TEL" is displayed and adjacent to which a telephone number is displayed which is input in the same window. The window also displays: the word "ADDRESS" and an address adjacent thereto that is input; the word "FAX" and a telephone number for facsimile transmission adjacent thereto that is input; and the word "REMARKS" and remarks adjacent thereto that is input into the apparatus by the user.

A case where inputting with the memo window shown in FIG. 5 is effected on the input/output screen (LCD 17) shown in FIG. 1 will be described below. In this window, data on a date, time, a name and a telephone number, and a message relating to a business matter settled by a preliminary arrangement are arranged in arbitrary positions on digitizer 10 with pen 11 like notes taken on memo paper. Also, reserved word "NA" 22 is placed in front of name data 24 and reserved word "Mr." indicating the end of the name data 26 is placed at the end of the name data. Similarly, reserved word "TEL" 23 is placed in front of telephone number data 25. These words are also placed on digitizer 10 by pen 11.

When menu button 20 in the window shown in FIG. 5 is operated with the stylus pen 11 after the completion of the inputting operation, the menu shown in FIG. 4 is displayed and, if the termination of processing with respect to the memo window is selected, the above-described automatic item input routine is selected. In step S1 of the method shown in FIG. 3, the character data displayed in the window shown in FIG. 5 is read as one stream of data. In step S2, scanning is performed from the leading end of the data stream, i.e, a left top position to the right as viewed in the display window of FIG. 5. When scanning through the first line is completed, scanning in the second line is started. When scanning in the third line is started, the reserved word "NA" 22 is first detected and the process flow branches off to step S3. In step S3, reserved word "NA" is identified as a reserved word followed by name item data which could be registered or which could already be registered in the address note format. In step S4, a window format of the address note format determined as a proper format in step S3 is prepared in buffer 15B.

In step S5, the data which follows reserved word "NA" 22 is searched for in memory 15 and reserved word "Mr." 26 indicating the end of name item data 24 is detected. In this case, if reserved word "Mr." 26 designating the end of the name data is detected, the preceding data is identified as name item data. In step S6, name item data 24 obtained in step S5 is copied to the name item storage position 34 in the address note format buffer prepared in step S4. The process then returns to step S2 to scan the rest of the data stream, and reserved word "TEL" 23 indicating a telephone number item data which could be registered in an address note format and displayed in the address note window is detected from the fourth line in the window shown in FIG. 5. Processing of steps S3 to S6 is thereafter performed as described above. Thus, the telephone number item data 24 is copied to the telephone item storage position 35 in the address note format buffer prepared in step S4. The data boundary to be discriminated in step S5 is a blank space indicating the end of telephone number data 25 or a character or code designating a start of a new line.

When in step S2 the end of data stream to be scanned is reached, the process proceeds to step S7 to determine whether buffer 15B has been prepared in step S4. If it has not been prepared, the automatic item input routine is terminated. If buffer 15B has been prepared, the process proceeds to step S8 to display the address note format window automatically copyed temporarily in the buffer, as shown in FIG. 6. In step S9, a determination is made by device 14 as to whether the data is to be registered. To register the data, the process proceeds to step S10 to copy the data into the address note area 15C as data corresponding to a correct item in the address note format and as address format data in the buffer. If it is determined in step S8 that the data will not be registered by device 14, the process is terminated without copying the data in the buffer.

According to the above-described embodiment, all data corresponding to items of the address note, the schedule note, and so on, which appear frequently can be input in the memo mode and information effective in different applications is also registered automatically or selectively, thereby achieving efficient data utilization.

Figure 7:
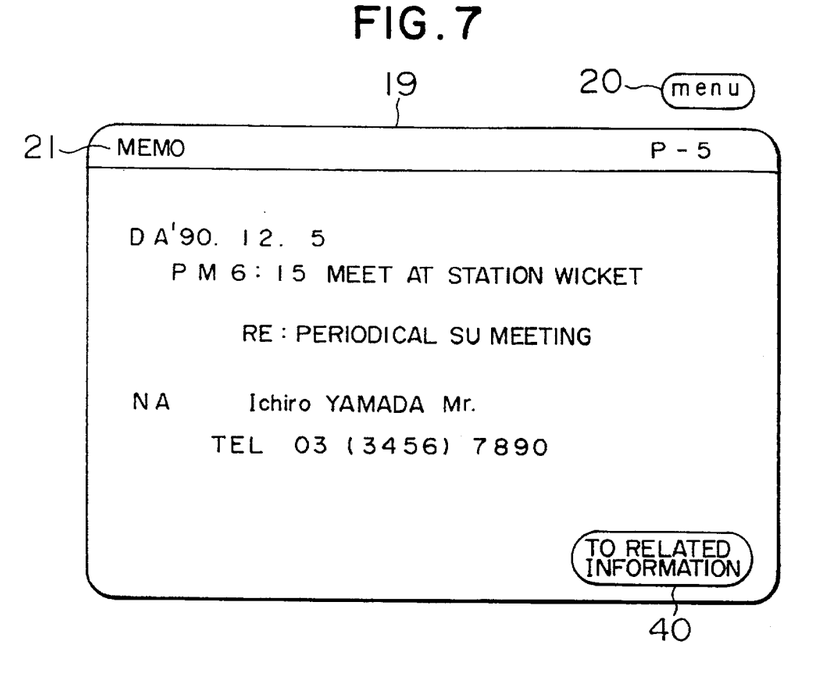
FIG. 7 is an illustration of a memo window.
Figure 8:
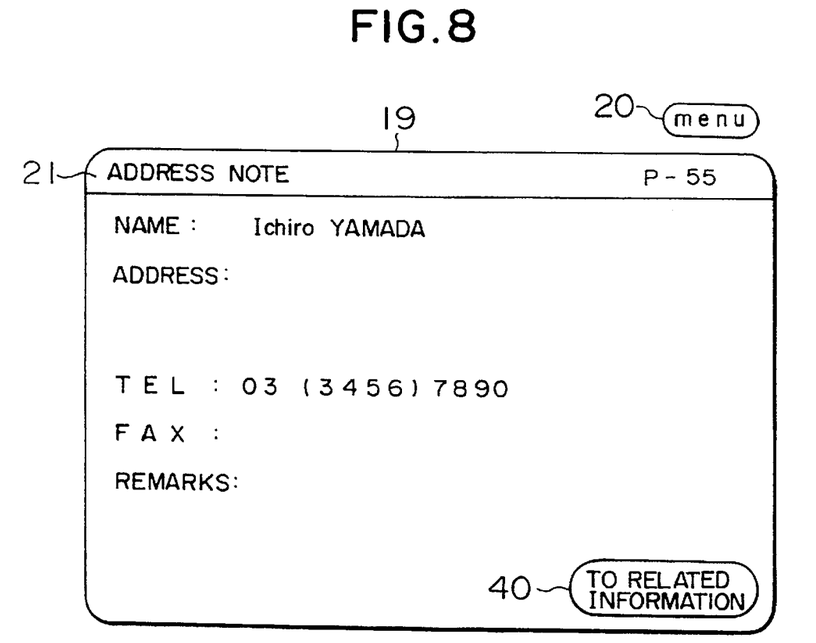
FIG. 8 is an illustration of the address note.

In the above-described embodiment, information input for one application using a memo window is registered as data effective in other applications. Further, as shown in FIGS. 7 and 8, related information may be set to enable a direct move, for example, from the starting application memo format window of FIG. 7 to another application format window (the address note format window) of FIG. 8 which is automatically registered. Such movement between windows can be accomplished by placing pen 11 on a command icon ("To related information" 40 in this embodiment) for moving to related information between the windows of FIGS. 7 and 8. It is thereby possible to effect a move from the memo window of FIG. 7 to the address note window of FIG. 8 related to the memo window or from the address note window to the related memo window without using any command selected by operating menu key 20, so that the operation for searching for related information from each application window can be remarkably simplified.

In the above-described embodiment, even in a case where one application is selected, data which can be effectively used in other applications can be detected, sorted and automatically registered by using a reversed word placed in front of or at the rear of each data unit. Thus, the input operation can be effected continuously as in the case of taking notes on a sheet of paper, thereby enabling efficient utilization of information.

The need for an application change operation and a relation setting operation in the input operation is eliminated, so that an electronic information apparatus free from such causes of the interruption of thinking can be provided.

The present invention may be applied to a system formed of a plurality of information apparatuses or to one unit of an information apparatus. Needless to say, the invention can also be applied to a means for achieving the same effect by supplying a program to a system or an apparatus.

According to the present invention, as described above, information in different formats can be input by a simple operation.

The individual components represented by the blocks shown in FIG. 1 are well known in the electronic information apparatus art and their specific construction and operation are not critical to the invention or the best mode for carrying out the invention. Moreover the steps discussed in the specification and shown in FIG. 3 for carrying out the invention can be easily programmed into well known central processing units by persons of ordinary skill in the art and since such programming per se is not part of the invention, no further description thereof is deemed necessary.

While the present invention has been described with respect to what presently is considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic information apparatus comprising:
   storing means for storing a plurality of formats for outputted information;
   input means for inputting information to be registered, containing a discriminator identifying the format of the inputted information;
   detection means for detecting the discriminator on the basis of the information input by said input means;
   extraction means for extracting particular information associated with the discriminator detected by said detection means;
   selecting means for automatically selecting a format identified by the discriminator contained in the inputted information to be registered, stored by said storing means, and detected by said detection means without a user inputting additional information via a keyboard; and
   registration means for registering the extracted particular information associated with the discriminator detected by said detection means as particular information in the format selected by said selecting means.

2. An electronic information apparatus according to claim 1, wherein said input means comprises coordinate input means for inputting the coordinates of the input information.

3. An electronic information apparatus according to claim 1, further comprising recognition means for recognizing the information input by said input means.

4. An electronic information apparatus according to claim 3, further comprising memory means for storing the information recognized by said recognition means.

5. An electronic information apparatus according to claim 4, further comprising display means for displaying the recognized information stored in said memory means.

6. An electronic information apparatus according to claim 1, further comprising memory means for storing the particular category of information registered by said registration means.

7. An electronic information apparatus according to claim 1, wherein said input means inputs the information containing the discriminator when the inputting of a first format is finished.

8. An electronic information apparatus according to claim 1, wherein the operation of said input means is performed on the basis of an instruction of an operator.

9. An electronic information apparatus according to claim 1, wherein the plurality of formats are stored every time an application program is executed.

10. A method of collecting information, which uses storing means storing a plurality of formats for output information, comprising:
    an input step of information to be registered, containing a discriminator for identifying one of the formats of the inputted information;

a detecting step of detecting the discriminator from the information input in said input step;

an extraction step of extracting particular information associated with the discriminator detected in said detecting step;

a selection step of automatically selecting one of the formats identified by the discriminator contained in the inputted information to be registered, stored by storing means, and detected in said detecting step without a user inputting additional information via a keyboard; and a registration step of registering the extracted particular information associated with the discriminator detected in said detecting step as the particular information in the format selected by said selection step.

11. A method according to claim 10, further comprising a recognition step of recognizing the information input in said input step.

12. A method according to claim 11, further comprising a storage step for storing in memory means the information recognized in said recognition step.

13. A method according to claim 12, further comprising a storage step for storing in another memory means the particular category of information registered in said registration step.

14. A method according to claim 12, further comprising a display step for displaying the recognized information stored in said memory means.

15. A method according to claim 12, wherein said input step is performed when the inputting of a first format is finished.

16. A method according to claim 10, wherein said inputting input step is performed on the basis of an instruction of an operator.

17. A method according to claim 10, wherein the plurality of formats are stored every time an application program is performed.

18. An electronic information apparatus comprising:

storing means for storing a plurality of formats for output information;

input means for inputting information to be registered, containing a discriminator identifying one of the formats of the information;

detecting means for detecting the discriminator on the basis of the information input by said input means;

extraction means for extracting particular information from the input information associated with the discriminator detected by said detecting means;

selection means for automatically selecting one of the formats identified by the discriminator contained in the inputted information to be registered, stored by said storing means, and detected by said detecting means without a user inputting additional information via a keyboard;

registration means for registering the extracted particular information associated with the discriminator detected by said detecting means as particular information output in a format selected by said selecting means; and output means for outputting the particular information registered by said registration means in the format selected by said selection means.

19. An electronic information apparatus according to claim 18, wherein said input means comprises coordinate input means for inputting coordinates of the pattern.

20. An electronic information apparatus according to claim 19, further comprising recognition means for recognizing information input by said input means.

21. An electronic information apparatus according to claim 20, further comprising memory means for storing the information recognized by said recognition means.

22. An electronic information apparatus according to claim 21, further comprising display means for displaying the recognized information stored in said memory means.

23. An electronic information apparatus according to claim 18, further comprising memory means for storing the particular category of information registered by said registration means.

24. An electronic information apparatus according to claim 18, wherein said inputting of information is performed by said input means when the inputting of a first format is finished.

25. An electronic information apparatus according to claim 18, wherein the inputting of information by said input means is performed on the basis of an instruction of an operator.

26. An electronic information apparatus according to claim 18, wherein the plurality of format are stored every time an application program is performed.

27. A method of collecting information, in which storing means is used for storing a plurality of formats for output information, comprising:

an input step of inputting the information to be registered, containing a discriminator identifying one of the formats of the inputted information;

a detection step of detecting the discriminator from the information input by said input step;

an extraction step of extracting particular information associated with the discriminator detected by said detection step;

a selection step of automatically selecting a format identified by the discriminator contained in the inputted information to be registered, stored by the storing means, and detected by said detection step without a user inputting additional information via a keyboard;

a registration step of registering the extracted particular information associated with the discriminator detected by said detection step; and an output step of outputting the particular information registered by said registration step in the format selected by said selection step.

28. A method according to claim 27, further comprising a recognition step of recognizing the information input in said input step.

29. A method according to claim 28, further comprising a storage step for storing in memory means the information recognized in said recognition step.

30. A method according to claim 29, further comprising a display step for displaying the recognized information stored in said memory means.

31. A method according to claim 27, further comprising a storage step for storing in memory means the particular category of information registered in said registration step.

32. A method according to claim 27, wherein said input step is performed when the inputting of a first format is finished.

33. A method according to claim 27, wherein said input step is performed on the basis of an instruction of an operator.

34. A method according to claim 27, wherein the plurality of formats are stored every time an application program is performed.

* * * * *

UNITED STATES PATENT AND TRADEMARK OFFICE
CERTIFICATE OF CORRECTION

PATENT NO. : 5,644,339
DATED : July 1, 1997
INVENTOR(S) : MORI ET AL.

It is certified that error appears in the above-identified patent and that said Letters Patent is hereby corrected as shown below:

COLUMN 2:
    Line 40 "comprises" should read --comprise--.

COLUMN 5:
    Line 20, "buffer buffer" should read --buffer--.

COLUMN 7:
    Line 7, "copyed" should read --copied--.

COLUMN 9:
    Line 29, "claim 12" should read --claim 10--.

COLUMN 10:
    Line 20 "format" should read --formats--.

Signed and Sealed this

Thirteenth Day of January, 1998

Attest:

Attesting Officer

BRUCE LEHMAN

Commissioner of Patents and Trademarks